United States Patent [19]
Lumelsky et al.

[11] Patent Number: 5,162,779
[45] Date of Patent: Nov. 10, 1992

[54] POINT ADDRESSABLE CURSOR FOR STEREO RASTER DISPLAY

[75] Inventors: Leon Lumelsky, Stamford, Conn.; Lawrence Cheng, Hastings-on-Hudson; Sung M. Choi, White Plains, both of N.Y.

[73] Assignee: International Business Machines Corporation, Armonk, N.Y.

[21] Appl. No.: 733,945

[22] Filed: Jul. 22, 1991

[51] Int. Cl.⁵ .............................................. G09G 3/02
[52] U.S. Cl. .................................... 340/709; 340/729; 358/88
[58] Field of Search .................. 345/119, 125; 358/88, 358/90; 340/729, 709, 706, 750; 359/462, 464

[56] References Cited

U.S. PATENT DOCUMENTS

| | | | |
|---|---|---|---|
| 4,214,267 | 7/1980 | Roese et al. | 358/88 |
| 4,317,114 | 2/1982 | Walker | 340/721 |
| 4,562,463 | 12/1985 | Lipton | 358/88 |
| 4,599,611 | 7/1986 | Bowker et al. | 340/721 |
| 4,791,478 | 12/1988 | Tredwell et al. | 340/709 |
| 4,808,979 | 2/1989 | DeHoff et al. | 340/709 |
| 4,835,528 | 5/1989 | Flinchbaugh | 340/709 |
| 4,987,527 | 1/1991 | Hamada et al. | 340/709 |

Primary Examiner—Alvin E. Oberley
Assistant Examiner—Regina Liang
Attorney, Agent, or Firm—Perman & Green

[57] ABSTRACT

A stereoscopic sursor for high-resolution stereoscopic raster display is addressable to any arbitrary point on the display and simulates depth by alternately displaying left and right patterns that are offset from one another in a horizontal (x-axis) direction. Left and right views of the cursor are alternately displayed at the display frame rate, while a shutter mechanism presents the appropriate views to the viewer's eyes. To further enhance the perception of depth, monoscopic depth cues are provided by varying the cursor's color, size, transparency and/or pattern as the cursor moves in depth.

20 Claims, 7 Drawing Sheets

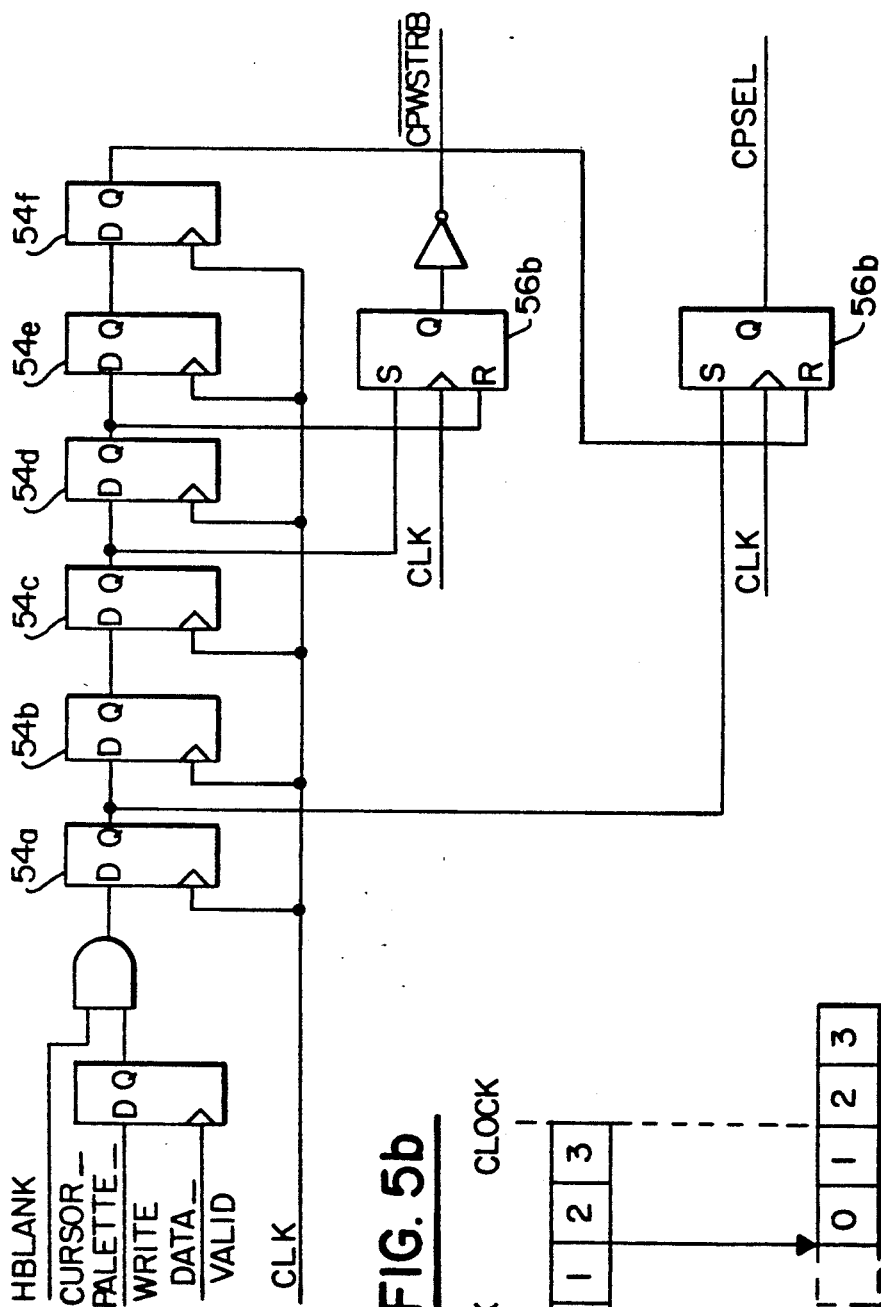
FIG. 8
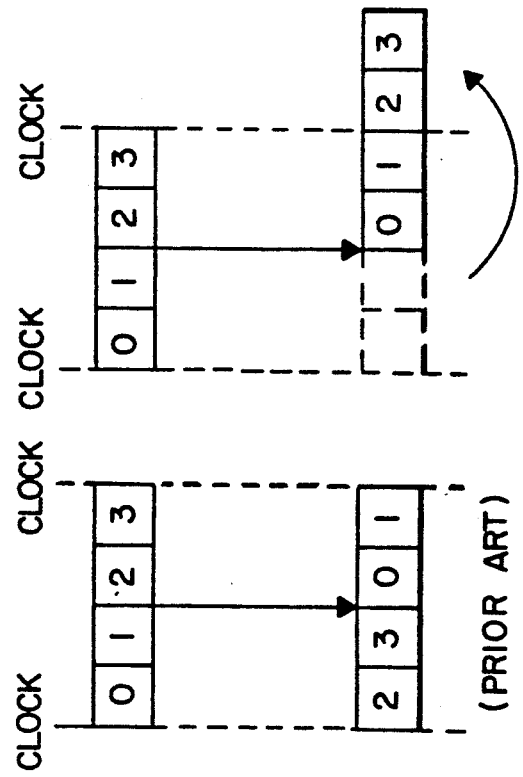
FIG. 5b
FIG. 5a (PRIOR ART)

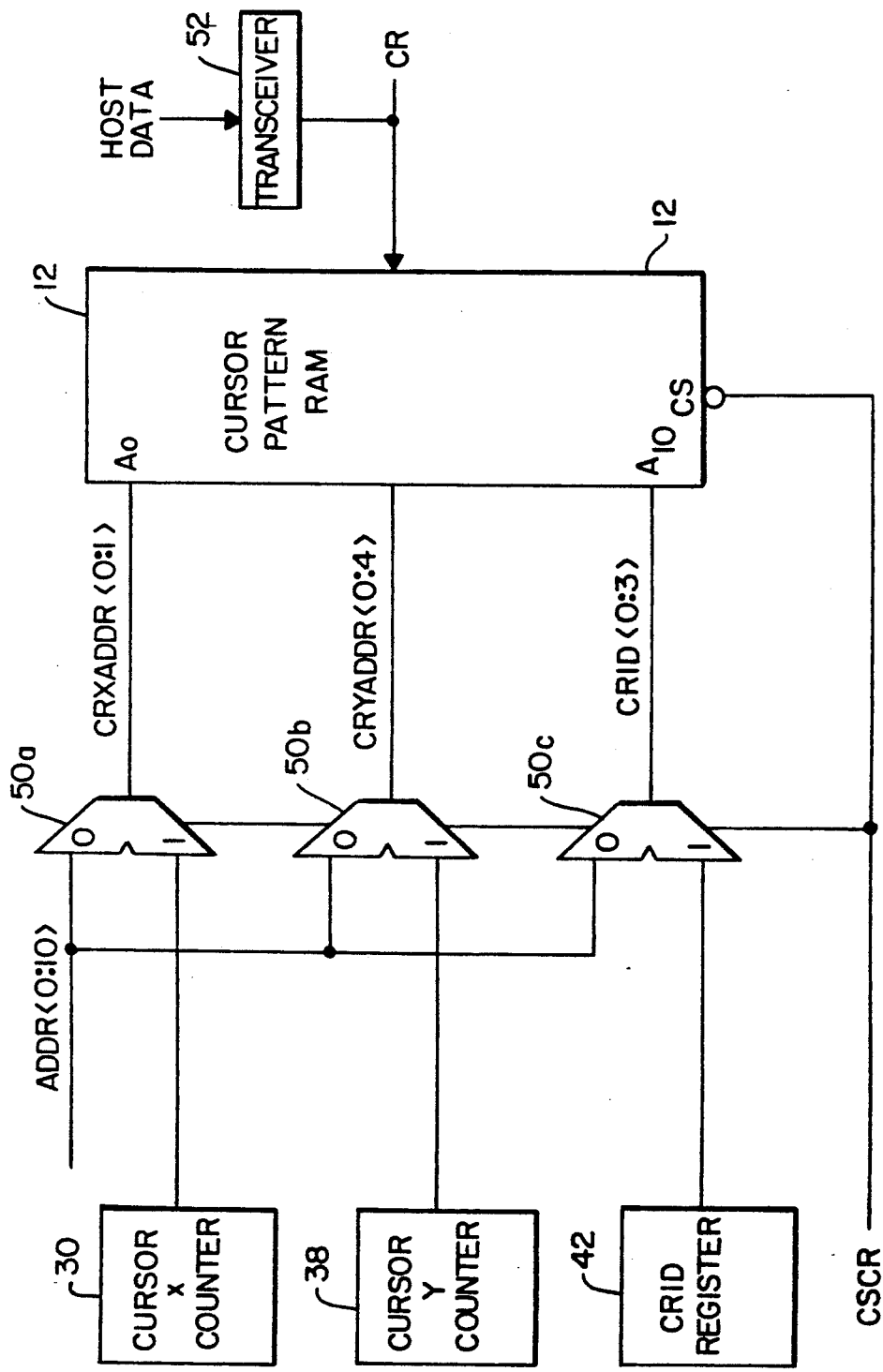

POINT ADDRESSABLE CURSOR FOR STEREO RASTER DISPLAY

FIELD OF THE INVENTION

This invention relates generally to display apparatus and method and, in particular, to apparatus and method providing a displayable three-dimensional (3-D) cursor for use with a 3-D display system.

BACKGROUND OF THE INVENTION:

With the advent of high-resolution stereoscopic displays, a desirable function is a cursor that is positionable within three dimensions, as opposed to the conventional two-dimensional (2-D) cursor. A conventional 2-D cursor, when viewed with stereo images, appears to lie in only one image plane. This is unsatisfactory in that a viewer is given confusing depth cues. A further problem with the use of a 2-D cursor is that the viewer may only reference points along a display x-axis and y-axis, but not along the display z-axis (depth).

The following U.S. patents are cited as showing various stereoscopic display systems and/or the use of a 3-dimensional cursor.

In U.S. Pat. No. 4,214,267, issued Jul. 22, 1980, entitled "Stereofluoroscopy System", to Roese et al. there is described a mechanism for generating a 3-dimensional cursor composed of two dots which may be displaced horizontally with respect to one another. The 3-dimensional cursor is said to read out a distance that may be sent to an external numerical readout.

In U.S. Pat. No. 4,562,463, issued Dec. 31, 1985, entitled "Stereoscopic Television System with Field Storage for Sequential Display of Right and Left Images" to Lipton there is described a stereoscopic television system that employs, for viewing, electro-optical occluding shuttered spectacles.

In U.S. Pat. No. 4,808,979, issued Feb. 28, 1989 entitled "Cursor for Use in 3-D Imaging Systems" to De-Hoff et al. there is described a cursor image that is said to include depth cue features to assist an observer in gauging the depth of a position being indicated. The cursor image is displayed on a CRT in left and right perspective projections of differing binocular disparity which are used by the observer to form a 3-dimensional image of the cursor. The cursor is said to include depth cues that continuously vary along the length of a tether symbol so as to allow the observer to properly register the position of the cursor within the 3-dimensional space.

In U.S. Pat. No. 4,835,528, issued May 30, 1989, entitled "Cursor Control System" to Flinchbaugh there is described the control of a two-dimensional, as opposed to a three-dimensional, cursor in three-dimensions.

In U.S. Pat. No. 4,987,527, issued Jan. 22, 1991, entitled "Perspective Display Device for Displaying and Manipulating 2-D or 3-D cursor, 3-D Object and Associated Mark Position" to Hamada et al. there is described cursor control in a system that positions a robot in three-dimensions.

In U.S. Pat. No. 4,791,478, issued Dec. 13, 1988, entitled "Position Indicating Apparatus" to Tredwell et al. there is described a system for producing a stereoscopic image of a scene that includes an object. Overlay generators superimpose on the image a stereoscopic image of a cursor. The cursor is said to vary in position, size, and appearance. This is accomplished by providing two separate channels, one for the left eye and one for the right eye. The two channels are preserved along an entire signal path from source to display. As a result, two separate monitors are required to view the cursor. That is, this patent does not provide left and right images that are shown sequentially on a single monitor.

Also of interest are the following two U.S. patents that teach the combining of images onto a common color display. Specifically, U.S. Pat. No. 4,599,611, issued Jul. 8, 1986 entitled "Interactive Computer-Based Information Display System," and U.S. Pat. No. 4,317,114, issued Feb. 23, 1982, entitled "Composite Display Device for Combining Image Data and Method".

What is not taught by these U.S. patents, and what is thus one object of the invention to provide, is novel circuit apparatus, and a method of using same, for displaying a 3-dimensional cursor upon a display, the cursor being provided with both stereoscopic and monoscopic depth cues.

SUMMARY OF THE INVENTION

The foregoing and other problems are overcome and the object of the invention is realized by a 3-D cursor for a high-resolution stereo raster display. The 3-D cursor is implemented with circuitry to address any arbitrary point on the display and to simulate depth by displaying left and right patterns that are offset from one another in a horizontal (x-axis) direction. Left and right views of the cursor are alternately displayed at a high frame rate, while a shutter mechanism, such as electrooptic spectacles, presents the appropriate views to the viewer's eyes. To further enhance the perception of depth, the cursor's color, size, transparency, and/or pattern may be varied as the cursor moves in depth (z-axis).

In accordance with the invention there is provided a method, and apparatus for accomplishing the method, for generating a cursor for use with a visual image that is displayed to a viewer so as to give an illusion of having a width along an x-axis, a height along a y-axis, and a depth along a z-axis. The method includes the steps of storing a first x-axis position of the cursor and storing a second x-axis position of the cursor. The first x-axis position and the second x-axis position are offset from one another by an amount that is a function of a position of the cursor along the z-axis. The method further includes the steps of storing a y-axis position of the cursor; storing a value that specifies a cursor pattern; and storing within a memory, at addressable locations, values that correspond to pixels that represent at least one specified cursor pattern. The method further includes the steps of selecting, for a first displayed image frame, the first stored x-axis position and for a second, immediately subsequent image frame, the second x-axis position; generating a first plurality of address bits when the display is displaying a pixel at a location that coincides with the selected xaxis value and the stored y-axis value; and addressing the memory with the first plurality of address bits and with a second plurality of address bits that are provided by the stored cursor pattern value so as to read out a pixel value that corresponds to a portion of the specified cursor pattern.

The method also includes the steps of converting the pixel value output by the memory to color values; and displaying the colors specified by the color values.

BRIEF DESCRIPTION OF THE DRAWING

The above set forth and other features of the invention are made more apparent in the ensuing Detailed Description of the Invention when read in conjunction with the attached Drawing, wherein:

FIG. 5a illustrates the operation of a 4-bit barrel shifter of the prior art;

FIG. 5b illustrates the operation of a delayed barrel shifter that is employed by the 3-D cursor generator of FIG. 4;

FIG. 7 illustrates circuitry for enabling the loading of a cursor pattern RAM of FIG. 4 from a host processor;

FIG. 8 is a schematic diagram illustrating circuitry for loading a cursor palette RAM illustrated in FIGS. 3 and 4;

DETAILED DESCRIPTION OF THE INVENTION

Figure 1:
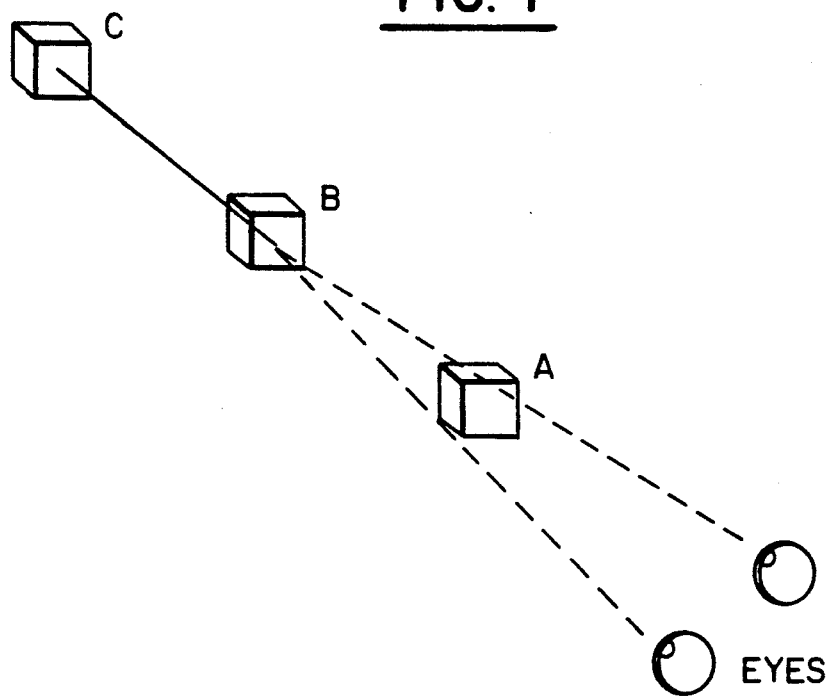
FIG. 1 depicts the stereoscopic perception of depth.

By way of introduction reference is made to FIG. 1. As seen in FIG. 1 stereoscopic perception of depth is a result of a horizontal offset between the left eye and the right eye. The viewer is thus presented with two slightly different views of a scene. In FIG. 1 the three objects designated A, B, and C are located at various distances from the viewer. The eyes are focused on the middle object, B. To focus on the nearer object, A, the eyes would cross more strongly To focus on the farther object, C, the eyes would relax and their individual lines of sight would be more parallel. It can thus be seen that the perceived depth can be varied by offsetting the left and right images of an object, with respect to one other.

Figure 2A:
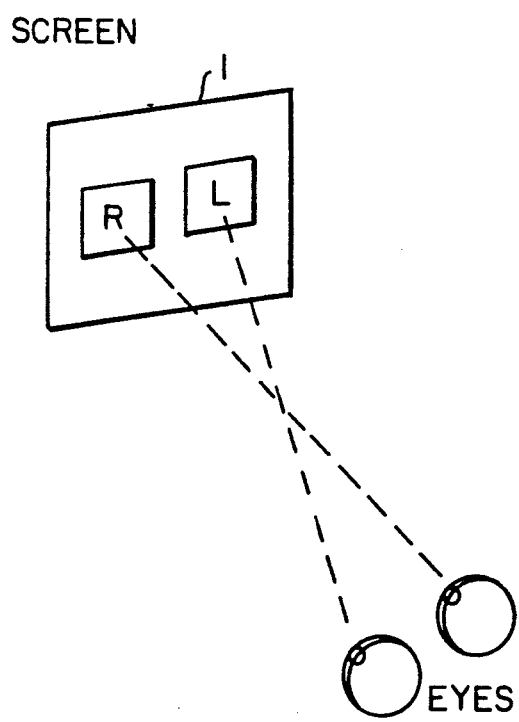
FIG. 2a illustrates the placement of a viewer's eyes for an object that is positioned close to the viewer.
Figure 2B:
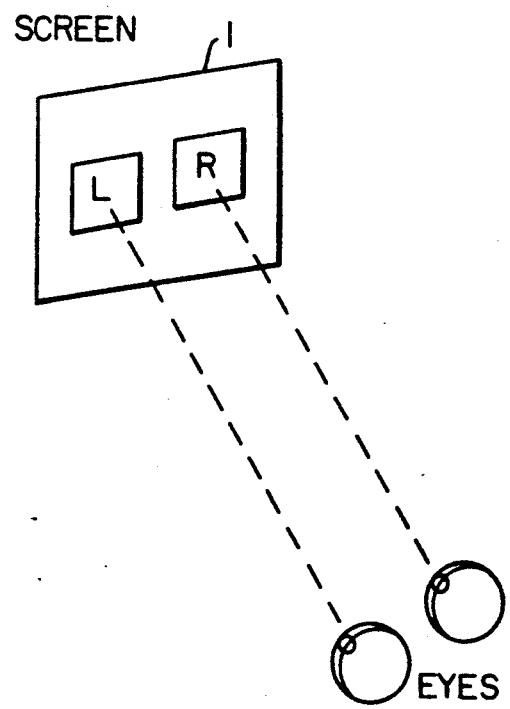
FIG. 2b depicts the placement of a viewer's eyes for an object that is positioned further away from the viewer.

FIG. 2a illustrates the placement of a stereo pair of images (L) and (R) for an object that is positioned close to the viewer FIG. 2b illustrates the corresponding placement for an object positioned away from the viewer. For a flat object, such as a cursor, depth is perceived only in relation to another object, whether the other object be part of the scene or a portion of the frame of the display. Separation between the images determines the strength of the depth effect. However, there is a comfortable limit to the amount of separation that can be provided. By example, it is desirable to separate the left and right images by no more than approximately eight millimeters for a 19 inch monitor at a viewing distance of about one meter. For a 1280 pixel ×1024 pixel display, this corresponds to a separation of approximately 30 pixels.

There are also monoscopic depth cues which provide depth information irrespective of eye offset. These depth cues are effective because humans are conditioned to accepting them as conveying depth information. A first cue is a variance in subject size with distance; as objects move backwards and forwards in depth they appear to decrease and increase in size, respectively. A second cue results from an atmospheric effect that causes objects to lose their brightness and color saturation as they recede from the viewer. A third cue is occlusion. That is, parts of an object are hidden, then exposed, as the object passes behind other, nearer objects.

By employing one or more of the monoscopic depth cues, in conjunction with the stereoscopic cue, a greater sense of depth is conveyed than is possible by using only left/right separation. A general purpose hardware cursor, whether for use with a mono or a stereo display, has the following desirable requirements: all-point addressability; a responsivity adequate for use with high-resolution displays; and an ability to change cursor color and pattern from a host controller. In addition, a stereo 3-D cursor has the following special requirements; an ability to display a left/right stereo pair whose separation, color, and size can by dynamically varied; and an ability to be obscured by image elements, given proper and complete depth information.

To realize this last requirement the system must have knowledge of the placement of image elements along the z-axis of the displayed scene. This information may be extracted by analyzing the stereo image pair. Given this information, the transparency of the cursor may be varied and mixed with the underlying image plane.

To realize all of these various requirements a circuit implementation of a 3-D cursor generator is described below. Briefly, the 3-D cursor is implemented as a relatively small frame buffer that may be "steered" to any position on the display.

Figure 3:
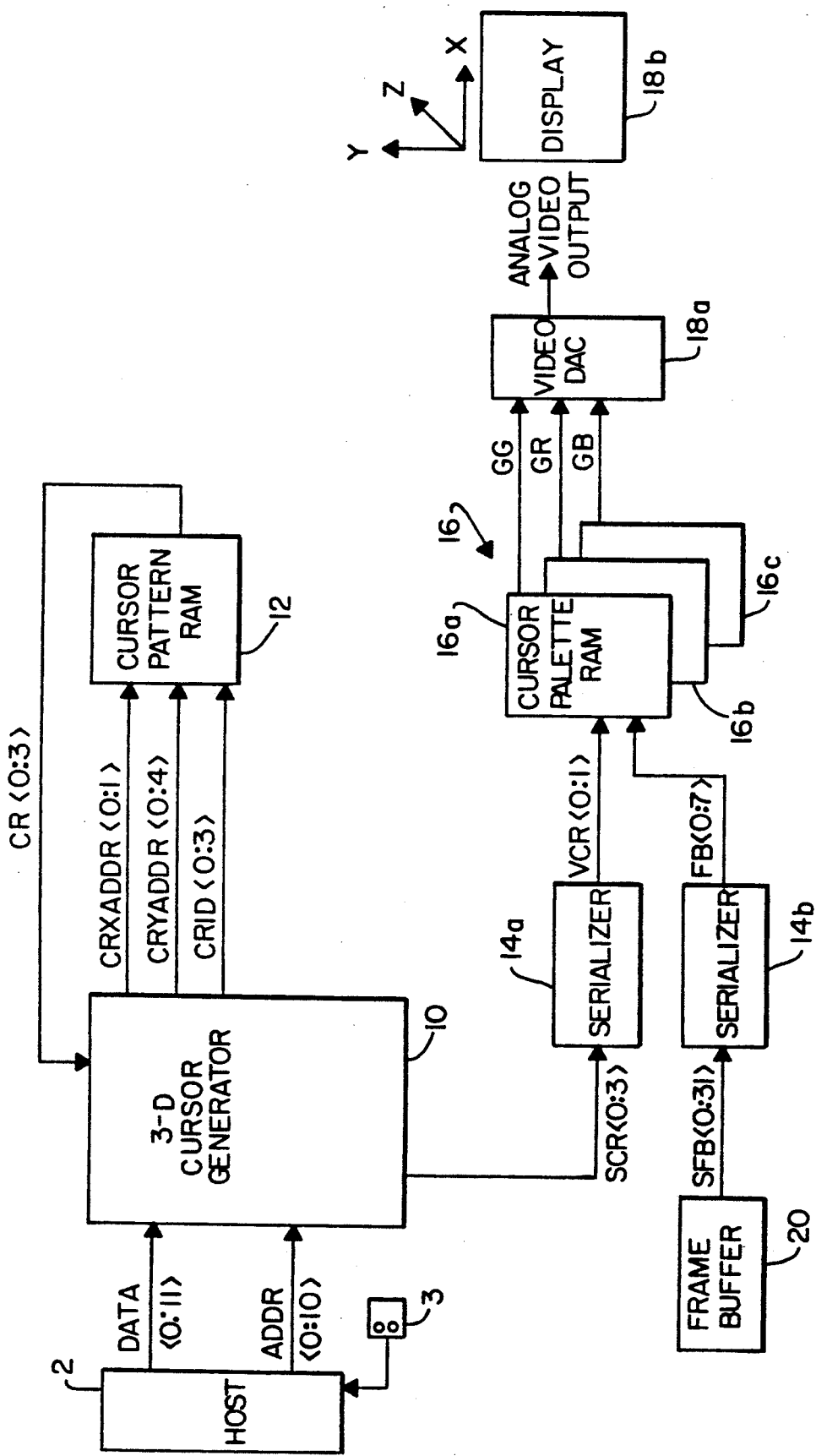
FIG. 3 is a block diagram depicting a presently preferred embodiment of a 3-D cursor generator and associated components.

Referring to FIG. 3 there is shown a block diagram of a presently preferred embodiment of the invention. A 3-D cursor generator 10 receives data and address inputs from a display system host processor 2. Host processor 2 is coupled to a suitable pointing device, such as a mouse 3 or a trackball, so as to receive input from a user as to a desired position of the the 3-D cursor within a displayed 3-D image. During use of the system the user views the display through a suitable optical shutter mechanism, of a type well-known in the art, to enable the displayed image to appear three dimensional.

The 3-D cursor generator 10 provides as outputs x-axis and y-axis cursor position information and a cursor identification to a cursor pattern RAM 12. An output of the cursor pattern RAM 12 is reapplied to the 30D cursor control logic 10, is barrel shifted, and is output as cursor pattern information to a serializer 14a. Another serializer 14b receives display information from a frame buffer 20. The cursor display information output by the serializer 14a is applied to a cursor palette RAM 16 which converts the cursor information to red, green, and blue color information that is applied to a video DAC 18a. The output of video DAC 18a is an analog video signal that is applied to a display 18b. The 3-D cursor is displayed in conjunction with image data provided from the frame buffer 20. In accordance with the invention, the 3-D cursor is controllably positioned within the 3-D display scene provided from the frame buffer 20. One suitable organization and method of operation for the frame buffer 20 is disclosed in commonly assigned U.S. patent application Ser. No. 733,950, filed 7-22-91, entitled "High Definition Multimedia Display", S. Choi et al.

Figure 4:
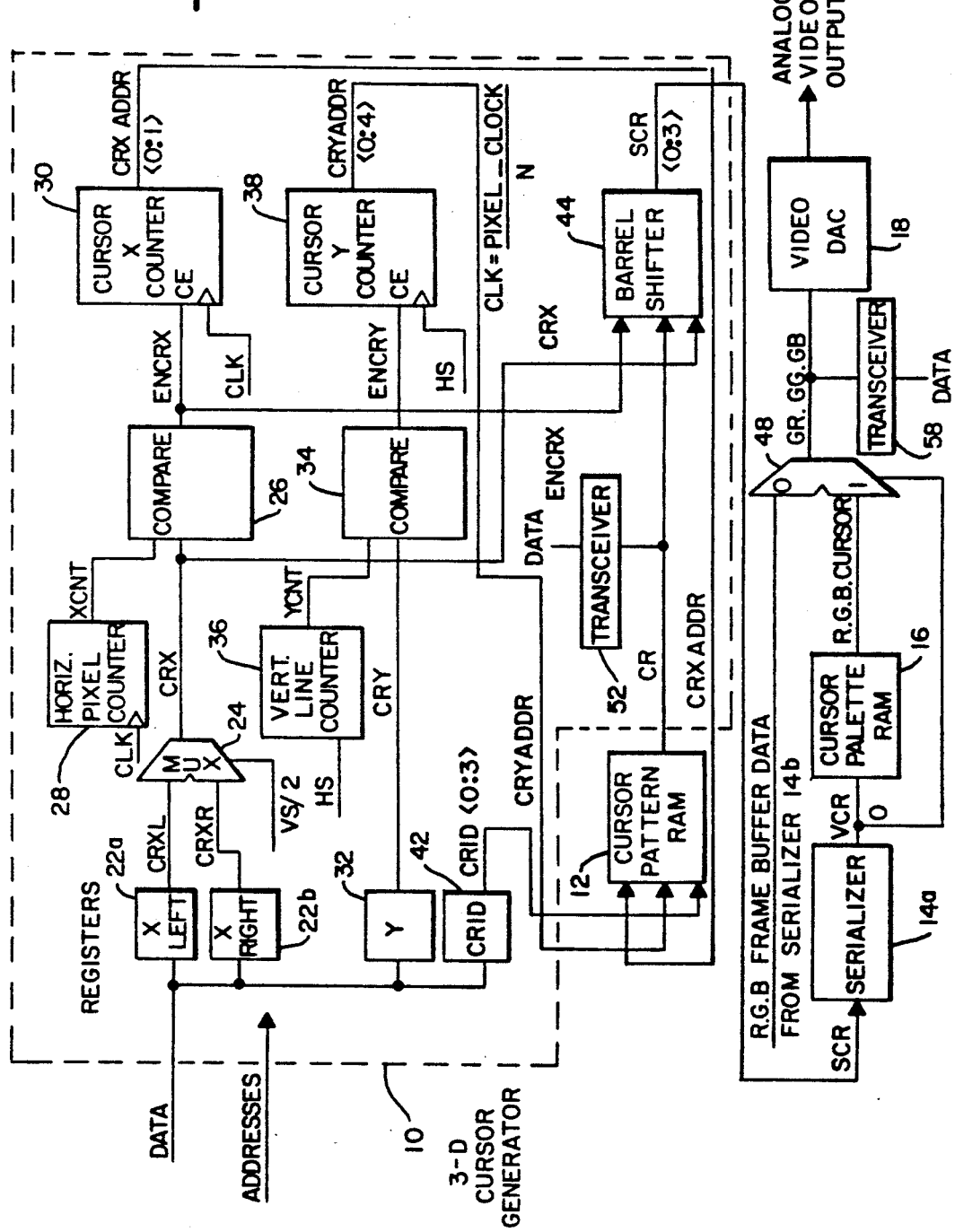
FIG. 4 is a block diagram that illustrates the construction of the 3-D cursor generator of FIG. 3.

FIG. 4 is a block diagram that illustrates the construction of the 3-D cursor generator 10. A set of registers contain the 3-D cursor's x-axis and y-axis locations within a displayed image. Specifically, there are two x-registers 22, one for a left view (22a) and one for a right view (22b) of the 3-D cursor. These registers 22a and 22b are written by the host 2 in response to input from the user. The values of registers 22a and 22b differ by an amount equal to a desired separation of the two image components (L and R) of the 3-D cursor. The contents of registers 22a and 22b are applied to separate inputs of a multiplexer 24 that has an output CRX. Which one of the two x-axis views that appears as CRX is selected as a function of a multiplexer 24 control signal, VS/2. VS/2 is a repetitive signal having a frequency of one-half of the display 18b vertical synchronization (VS) frequency. For example, for a vertical synchronization frequency of 120 Hz, VS/2 has a frequency of 60 Hz. As a result, the outputs of registers 22a and 22b are alternately selected at the display frame rate. The 3-D cursor x-position, CRX, is applied to a comparator 26. When CRX and the output (XCNT) of a horizontal pixel counter 28 are equal, a signal ENCRX is asserted. ENCRX enables a cursor X counter 30 to count a clock signal (CLK) and to output a cursor x-axis address signal (CRXADDR). The value of CRXADDR increments and forms the lower-order addresses to a cursor patterns RAM 40.

Similar circuitry processes the 3-D cursor y-axis position. A register 32 is written by the host processor with a desired 3-D cursor y-axis position. An output of register 32 (CRY) is applied to a comparator 34 in conjunction with an output of a vertical line counter 36. The vertical line counter 36 counts display 18b horizontal synchronization (HS) signals and generates a signal YCNT. When CRY equals YCNT the comparator 34 asserts a signal ENCRY to enable a cursor Y counter 38. Cursor Y counter 38 increments at the end of every display scan line by counting the HS signals. An output of the cursor Y counter 38 represents the cursor Y address (CRYADDR) and also functions as an address input to the cursor pattern RAM 12. CRXADDR and CRYADDR are applied to address inputs of the cursor pattern RAM 12 in conjunction with an output of a cursor identification (CRID) register 42. In a present embodiment of the invention the cursor pattern is defined to be a 32-pixel by 32-pixel pixel pattern. The address inputs to the cursor pattern RAM 12 are arranged such that the value of CRID selects different segments of the cursor pattern RAM 12, with data within each segment being addressed by the incrementing value of CRXADDR, corresponding to the x-axis pixel position of the horizontal display sweep, and the y-axis (vertical) scan line value of CRYADDR. As a result, a portion of the horizontal pixel pattern corresponding to a specified vertical scan line of a specified cursor pattern is output by the cursor pattern RAM 12. By changing the value of CRID different regions of the cursor pattern RAM 12 are selected and the shape and/or size of the 3-D cursor may be changed. This is particularly useful for varying the shape and/or size of the 3-D cursor to correspond to different locations along the display depth, or z-axis.

Because of access speed limitations of presently available video RAMs (VRAMs), frame buffer memories are often organized in an interleaved fashion. For an interleaved frame buffer memory the pixel clock is divided down by a factor (n) into a lower-frequency system clock. As a result, for the 3-D cursor to provide all-point addressability it is necessary to position the 3-D cursor bit pattern to sub-increments of the clock period. In accordance with an aspect of the invention this is accomplished by means of a modified n-bit barrel shifter 44. Barrel shifter 44 operates to arrange the 3-D cursor image pixels according to the least significant bits of CRX.

As seen in FIG. 5a a conventional barrel shifter rearranges the incoming bits in a circular pattern. However, this type of operation is not suitable for use for 3-D cursor generation with an interleaved frame buffer 20. Referring to FIG. 5b it can be seen that the barrel shifter 44 delays the shifted bits to a next clock period in order to produce the correct output sequence that corresponds to the interleaving of the frame buffer 20. As an example, for a frame buffer 20 interleave factor of four the two least significant bits of the CRX signal control the barrel shifter 44 in accordance with the sequence shown in Table 1.

TABLE 1

| CRX | | SCR OUTPUT | | | | | | | |
|---|---|---|---|---|---|---|---|---|---|
| | | Ith CLOCK | | | | (I + 1)th CLOCK | | | |
| <1> | <0> | 0 | 1 | 2 | 3 | 0 | 1 | 2 | 3 |
| 0 | 0 | i,0 | i,1 | i,2 | i,3 | i + 1,0 | i + 1,1 | i + 1,2 | i + 1,3 |
| 0 | 1 | i − 1,3 | 1,0 | i,1 | i,2 | i,3 | i + 1,0 | i + 1,1 | i + 1,2 |
| 1 | 0 | i − 1,2 | i − 1,3 | i,0 | i,1 | i,2 | i,3 | i + 1,0 | i + 1,1 |
| 1 | 1 | i − 1,1 | i − 1,2 | i − 1,3 | i,0 | i,1 | i,2 | i,3 | i + 1,0 |

For each of four possible CRX <1:0> combinations, CR(ij) inputs are assigned to the barrel shifter 44 output (SCR), where i designates the ith CLK period, (i+1) designates a next clock period, and j corresponds to the CR bit number.

If the frame buffer 20 is not interleaved, then the barrel shifter 44 is not required, assuming that the other components operate at a speed compatible with the video clock rate.

Figure 6:
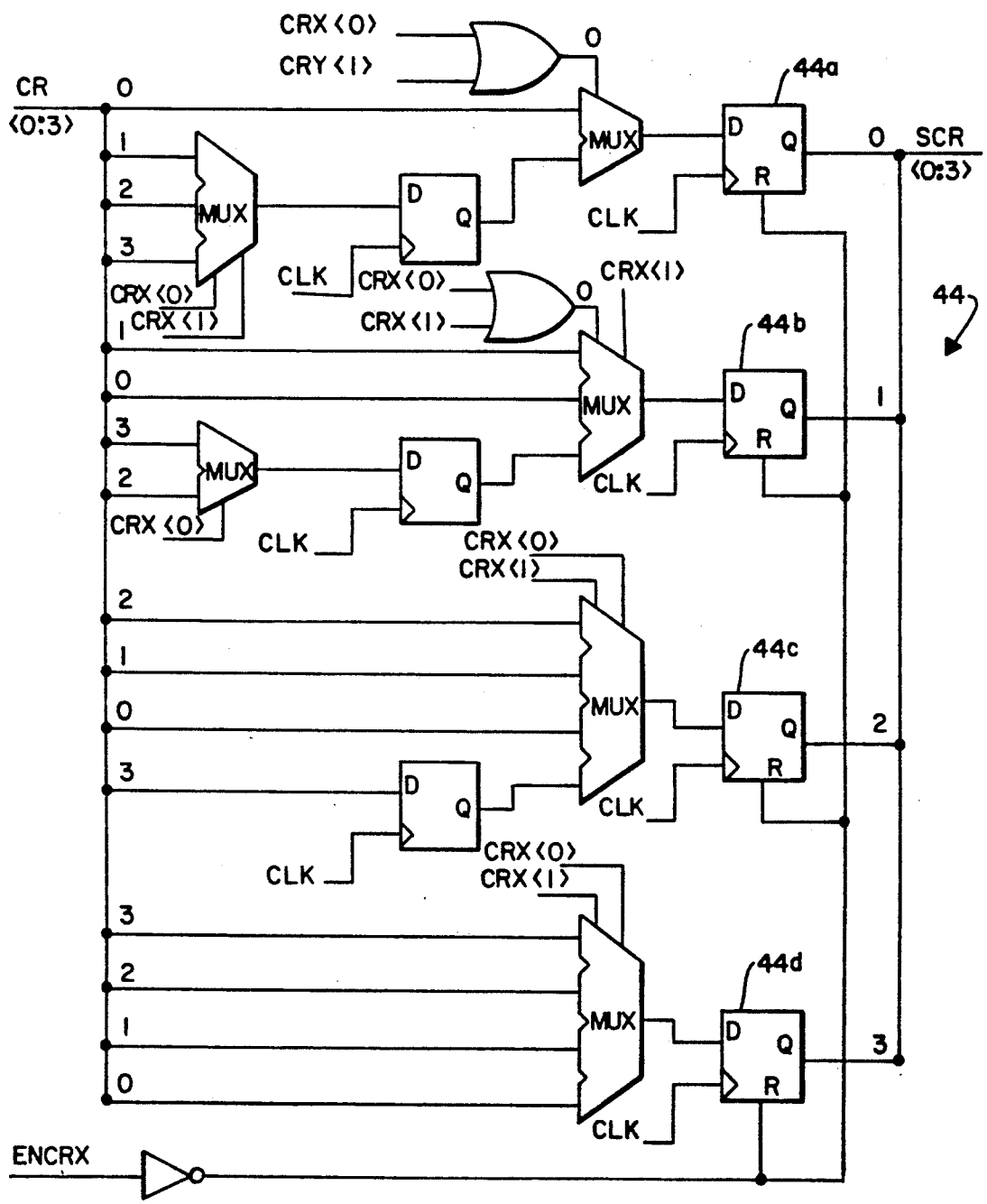
FIG. 6 is a schematic diagram showing the construction of the barrel shifter of FIG. 4.

The construction of the barrel shifter 44 is shown in greater detail in FIG. 6. The 4-bit barrel shifter 44 provides a delay that implements the pattern shown in Table 1. When the output of comparator 28 (ENCRX) is not asserted, the four output flip-flops (F/Fs) 44a–44d are reset. This enables the frame buffer 20 data to pass through to the video DAC 18a in that the cursor is not being displayed. When the ENCRX signal is asserted, indicating that the 3-D cursor is to be displayed, the F/Fs 44a–44d clock in the appropriate CRF information, as seen in Table 1, and provide the SCR output to the serializer 14a. As a result, the barrel-shifted 3-D cursor bit pattern is passed through to the serializer 14a, the cursor palette RAM 16, and to the video DAC 18 for display. The 4-bit barrel shifter 44 depicted in FIG. 6 may be readily expanded to an 8-bit barrel shifter or may be further modified to provide a barrel shifter suitable for use with an interlaced display. For an interlaced display embodiment 3-D cursor pattern lines stored within the cursor pattern RAM 12 must be allocated to the correct display field, if the cursor pattern lines are stored sequentially.

For some applications more than one 3-D cursor is displayed, such as when it is desired to display one cursor on top of another. For m cursors displayed simultaneously the cursor pattern RAM 12 is partitioned into m separate sections. The output CR thus is represented by m×n bits, and m n-bit barrel shifters are employed.

It is noted that such a cursor RAM structure may be employed to assign more than one bit to each pixel of the cursor. In general, the cursor RAM structure may include m, one-bit per pixel planes to one, m-bits per pixel plane.

Referring again to FIG. 4 the barrel shifter 44 output, SCR, feeds into the serializer 14a. The serializer 14a is implemented with an m-bit by n-bit shift register. The serializer 14a inputs m ×n bits of data in parallel and outputs m words serially. The resultant bit stream, VCR, is an input into the cursor palette RAM 16, and selects data from one of m color registers to be displayed. VCR also determines when the 3-D cursor color data is to overlay the frame buffer 20 data. This is accomplished by connecting the VCR signal to a control input of a multiplexer 48 to select between the output of the cursor palette RAM 16 or the R, G, B frame buffer 20 data from serializer 14b.

The following components are all loadable from the host 2: the x-left register 22a, the x-right register 22b, the y-register 32, the CRID register 42, the cursor pattern RAM 12, and the cursor palette RAM 16. The cursor pattern RAM 12 is typically loaded with a desired cursor pattern at system initialization and need not be reloaded during operation, although for some applications this may be desirable. A preferred technique for loading and reloading the cursor pattern RAM 12 is described in detail below. The x-left register 22a, the x-right register 22b, the y-register 32, and the CRID register 42 may be reloaded during operation without adversely influencing the displayed cursor. However, the cursor palette RAM 16 output continuously feeds the video DAC 18. Thus, reloading the palette RAM 16 would disturb the video image of the 3-D cursor unless accesses to the cursor palette RAM 16 are synchronized, as described below, to the horizontal blanking period of the display 18b.

The width of the signal buses depicted in FIGS. 3 and 4 is dependent upon system requirements. For the example illustrated it is assumed that the display monitor has 1280×1024 active pixels, the frame buffer 20 memory is interleaved four ways, and the clock (CLK) frequency is ¼ of the pixel clock frequency. CRX is preferably at least 11 bits wide. For CRY, 10 bits would be sufficient, but in that the display 18b has a blanking period of finite duration, 11 bits are required so that the 3-D cursor may lie partially outside of the displayed area. That is, ten bits gives $2^{10}$, or 1024 addresses, corresponding to 1024 display lines. To position the top left corner of the 3-D cursor above the first scan line requires a y-address comparison (comparator 34) within the blank area above the displayed area. This blank area must then also include additional scan lines, that is scan lines in excess of 1024. As a result, CRY is made 11-bits wide to provide the additional scan lines.

In that CLK is ¼ the pixel clock frequency, XCNT need only be 9 bits wide. Thus, the comparator 28 only need compare the most significant 9-bits of the 11-bit CRX value.

Also, by example, cursor pattern RAM 12 is made large enough to store 16 separate 32-pixel by 32-pixel 3-D cursor patterns. For this case, m=2, which is achieved by providing the cursor pattern RAM 12 output (CR) to be 8-bits in width, as opposed to 4-bits. The barrel shifter 44 output (SCR) is thus also 8-bits in width and the serializer 14a includes two 4-bit serializers for inputting, in parallel, SCR <0:7> and for serially outputting VCR <0:1>.

The cursor palette RAMs 16 are preferably high-speed pipelined SRAMs, such as those known in the art as Bt401s. Each of the cursor palette RAMs 16 includes three overlay registers, each storing one color. VCR <0:1> are connected to the select pins for these registers. When VCR <0> is asserted, a first one of the registers (16a) is selected. When VCR <1> is asserted, the second register (16b) is selected. When both VCR <0> and VCR <1> are asserted, the third overlay register (16c) is selected. When neither VCR <0> or VCR <1> are asserted, the frame buffer 20 data is selected via multiplexer 48.

When writing the desired 3-D cursor pattern bitmap into the cursor pattern RAM 12, the RAM 12 addresses may be controlled, for example, to increment the cursor x-counter 30 and/or the cursor y-counter 38 after each write cycle. However, a preferred technique is illustrated in FIG. 7, wherein multiplexers 50a-50c are employed to multiplex the host 2 address lines (ADDR<0:10>) with the outputs of the counters 30 and 38 and the output of the CRID register 42. The cursor pattern RAM 12 chip select signal (CSCR−) is asserted during the write mode and is also employed as the multiplexer 50a-50c select signal so as to select the ADDR<0:10> signals. Transceiver 52 is also enabled during the write cycle to multiplex the host data lines onto the CR output bus of the cursor pattern RAM 12.

To prevent undesirable display artifacts from appearing on the display 18b, when updating the cursor palette RAM 16, write cycles to this device are synchronized to the horizontal blanking period of the display 18b. As seen in FIG. 8, this is accomplished by synchronizing the cursor palette RAM 16 write signal with the horizontal blank signal (HBLANK). The logic generates two signals: a cursor palette RAM select (CPSEL) from F/F 56a and a cursor palette RAM write strobe (CPWSTRB−) from F/F 56b. The serially coupled F/Fs 54a-54f implement one CLK period delay elements to ensure that CPSEL and CPWSTRB− meet the specific timing requirements for the particular palette RAM 16 that is used. The transceiver 58 seen in FIG. 4 is employed in a manner similar to the transceiver 52 to provide a data path for loading the cursor palette RAM 16 from the host 2.

In accordance with an aspect of the invention the stereoscopic depth cue, i.e., the separation of left and right cursor images, is implemented through the two x-position registers 22a and 22b, and may be provided with any arbitrary separation distance. As was previously noted, one suitable maximum separation distance corresponds, for a 1280 ×1024 pixel display, to approximately 30 pixels along the x-axis.

Further in accordance with the invention a number of different monoscopic depth cues may also be provided. By example, the content of the cursor ID register 42 is made a function of the z-axis position of the 3-D cursor. Thus, and as is illustrated in FIG. 9b, each different CRID content may display a cursor of the same shape or pattern, but of a different size. For this embodiment of a monoscopic depth cue, each different CRID value references a different bitmap in the cursor pattern RAM 12. As shown in FIG. 9b, for a first image plane corresponding to a first z-depth ($Z_1$), the 3-D cursor 3 has a first size. For a second image plane corresponding to a second z-depth ($Z_2$), the CRID register 42 is reloaded with a different value to select from a different region of the RAM 12 an identically shaped, but smaller sized, 3-D cursor pixel pattern.

Another monoscopic depth cue is provided by varying the color saturation of the 3-D cursor as a function of z-axis position. This is preferably accomplished by reprogramming, as required, the cursor palette RAM 16 to provide a different color saturation value for an identical shifted cursor signal (SCR) input.

The monoscopic depth cue of occlusion may be accomplished by several techniques. A presently preferred technique employs alpha mixing to blend the appropriate images. Alpha mixing is described in commonly assigned U.S. patent application Ser. No. 07/733,766, filed 7-22-91, entitled "Multi-source Image Real Time Mixing and Anti-aliasing", by S. Choi et al.

This alpha mixing technique assigns a value (alpha) to every pixel of the 3-D cursor. By example, if alpha has a value of 1.0 the associated pixel is opaque, while if alpha has a value of 0 the associated pixel is transparent. Intermediate alpha values produce intermediate degrees of transparency. By assigning different alpha values to the 3-D cursor pixels, for different z-axis depths, and by assigning a different set of alpha values to each image plane, the 3-D cursor may be made to disappear when it is occluded by objects located within the image plane. The alpha values may be stored externally to or, preferably, within the cursor palette RAM 16. Alpha pixel mixing occurs within the multiplexor 48.

To provide the stereoscopic and the monoscopic depth cues the host processor 2 monitors the depth of the 3-D cursor along the image z-axis. As a function of depth the host processor 2 varies the left/right x-axis separation value stored within x-registers 22, although not necessarily in a linear manner; varies the size of the 3-D cursor by changing the cursor ID value stored in register 42; varies the 3-D cursor color range from highly saturated to less saturated by reloading the color palette RAM 16; and provides for occluding the 3-D cursor by varying cursor pixel alpha (transparency) values from opaque (visible) to transparent (hidden). Any one, or any combination of the above, may be accomplished, depending on the requirements of a given application.

Figure 9A:
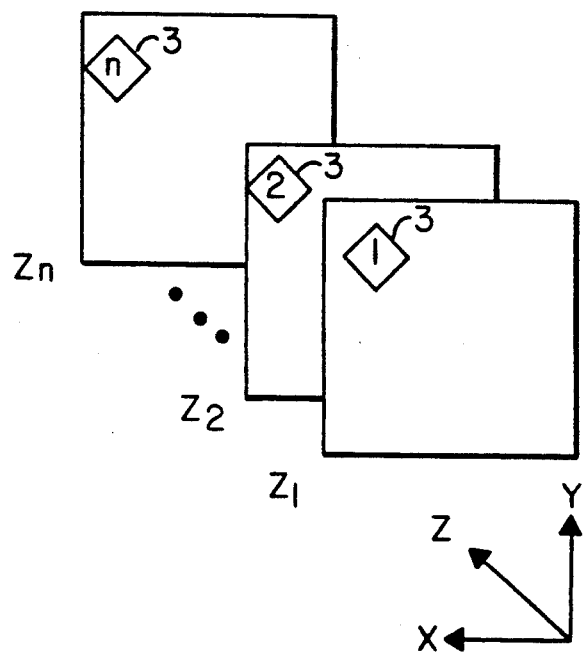
FIG. 9a depicts one method of providing a monoscopic depth cue for a 3-D cursor.
Figure 9B:
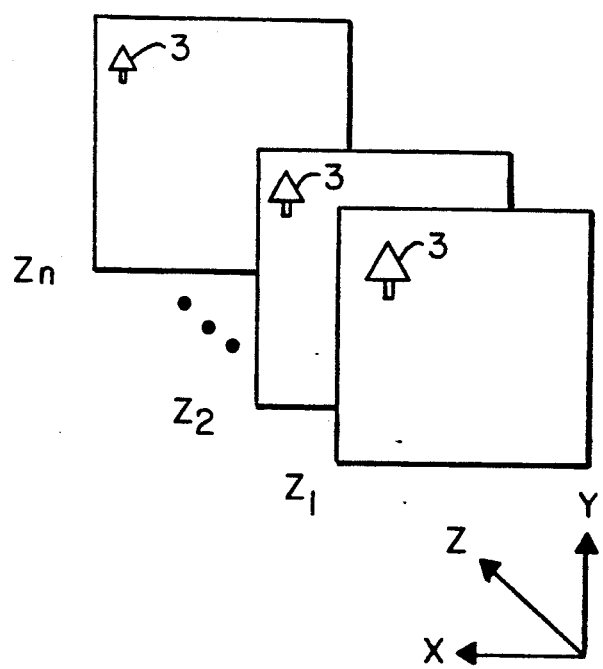
FIG. 9b illustrates another method of providing a monoscopic depth cue for a 3-D cursor.

A further technique is illustrated in FIG. 9a wherein the 3-D cursor pattern is changed altogether as the 3-D cursor traverses the z-axis. For example, the 3-D cursor is visualized by numbers that indicate depth, where a "1" indicates a closest image plane, where "2" indicates a next nearest image plane, etc. For this embodiment the cursor pattern RAM 12 has, in each of a plurality of regions, a 3-D cursor pixel pattern corresponding to a different one of the numbers. Similarly, the 3-D cursor color hue may change with depth. For example, red may indicate that the 3-D cursor is close to the viewer, while blue indicates that the 3-D cursor is located far from the viewer. Other hues reference intermediate distances.

Although described above in the context of specific circuit embodiments is should be realized that variations may be made therein while yet obtaining substantially the same result. For example, for some applications it may be desirable to replace the cursor pattern RAM 12 and the cursor palette RAM 16 with read only memory (ROM) devices. As such, circuitry for loading or reloading these memory elements from the host 2 may be eliminated. It should also be realized that the teaching of the invention applies also to monochrome display systems and is not restricted for use only with color displays.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. Apparatus for generating a cursor for use with a visual image that is displayed to a viewer so as to give an illusion of having a width along an x-axis, a height along a y-axis, and a depth along a z-axis, comprising:
   first means for storing a first x-axis position of the cursor;
   second means for storing a second x-axis position of the cursor, the first x-axis position and the second x-axis position being offset from one another by an amount that is a function of a position of the cursor along the z-axis;
   means, having a first input coupled to an output of the first storing means and a second input coupled to an output of the second storing means, for selecting on alternate displayed image frames the first input or the second input to be provided to an output;
   third means for storing a y-axis position of the cursor;
   fourth means for storing a value that specifies a cursor pattern; and fifth means for storing, at addressable locations, values that correspond to pixels that represent the selected cursor pattern, the fifth storing means having address inputs coupled to the output signals of the selecting means, to output signals of the third storing means, and to output signals of the fourth storing means for providing to an output a pixel value, the pixel value being read from one of the addressable locations that is specified by a combination of the output signals.

2. Apparatus as set forth in claim 1 and further including means, having an input coupled to the output of the fifth storing means, for converting the pixel values output thereby to color values.

3. Apparatus as set forth in claim 2 and further including means, having an input coupled to an output of the converting means, for displaying the colors specified by the color values.

4. Apparatus as set forth in claim 1 wherein the fifth storing means stores in a plurality of different regions thereof values for representing a plurality of different cursor patterns, a particular one of the regions being selected by the output signals of the fourth storing means.

5. Apparatus as set forth in claim 1 wherein the fifth storing means stores in a plurality of different regions values for representing, for a specific cursor pattern, a plurality of different cursor pattern sizes, a particular one of the regions being selected by the output signals of the fourth storing means.

6. Apparatus as set forth in claim 2 and further comprising means, having a first input coupled to an output of the converting means and a second input coupled to an output of a frame buffer means that stores a visual image, for selecting either the output of the converting means or the output of the frame buffer means.

7. Apparatus as set forth in claim 6 wherein the frame buffer means is interleaved and wherein the apparatus further includes means, having an input coupled to an output of the fifth storing means, for reordering the output of the fifth storing means in accordance with an interleave factor of the frame buffer memory means.

8. Apparatus as set forth in claim 7 wherein the reordering means includes a barrel shifter means.

9. Apparatus as set forth in claim 1 wherein the fourth means has an input coupled to a source of pixel pattern values for having the pixel pattern values stored within.

10. Apparatus as set forth in claim 3 wherein the converting means has an input coupled to a source of color values for having the color values stored within.

11. Apparatus as set forth in claim 10 wherein the converting means is further coupled to means for enabling the storage of the color values only during a horizontal blanking period of the displaying means.

12. A method for generating a cursor for use with a visual image that is displayed to a viewer so as to give an illusion of having a width along an x-axis, a height along a y-axis, and a depth along a z-axis, comprising the initial steps of:

storing a first x-axis position of the cursor;
storing a second x-axis position of the cursor, the first x-axis position and the second x-axis position being offset from one another by an amount that is a function of a position of the cursor along a z-axis;
storing a y-axis position of the cursor;
storing a value that specifies a cursor pattern; and
storing within a memory means, at addressable locations, values that correspond to pixels that represent at least one specified cursor pattern;
the method further comprising the steps of:
selecting, for a first displayed image frame, the first stored x-axis position and for a second, immediately subsequent image frame, the second x-axis position;
generating a first plurality of address bits when the display means is displaying a pixel at a location that coincides with the selected x-axis position and the stored y-axis position; and
addressing the memory means with the first plurality of address bits and with a second plurality of address bits that are provided by the stored cursor pattern value so as to read out a pixel value that corresponds to a portion of the specified cursor pattern.

13. A method as set forth in claim 12 and further including the steps of converting the pixel value output by the memory means to color values; and displaying the colors specified by the color values.

14. A method as set forth in claim 13 and further including a step of selecting either the output of the converting means or the output of a frame buffer means for display upon the display means.

15. A method as set forth in claim 14 wherein the frame buffer means is interleaved and wherein the method further includes a step of reordering the output of the memory means in accordance with an interleave factor of the frame buffer means.

16. A method as as set forth in claim 13 and, in response to a movement of the cursor along the z-axis, further includes a step of providing a monoscopic cursor cue by converting the pixel value output by the memory means to a color value having a different color saturation.

17. A method as as set forth in claim 12 and, in response to a movement of the cursor along the z-axis, further includes a step of providing a monoscopic cursor cue by storing a value that specifies a different cursor pattern.

18. A method as as set forth in claim 12 and, in response to a movement of the cursor along the z-axis, further includes a step of providing a monoscopic cursor cue by storing a value that specifies a different cursor pattern size.

19. A method as as set forth in claim 12 and, in response to a movement of the cursor along the z-axis, further includes a step of providing a monoscopic cursor cue by varying a transparency of pixels associated with a selected cursor pattern.

20. A method as set forth in claim 15 wherein the step of reordering includes a step of barrel-shifting the output of the memory means in accordance with a portion of the selected x-axis position.

* * * * *